May 9, 1933.　　　　F. EISELE　　　　1,908,478
MACHINE TOOL
Filed Jan. 14, 1932　　　　2 Sheets-Sheet 1

Inventor:
Felix Eisele
by Karl Liebknecht
Atty.

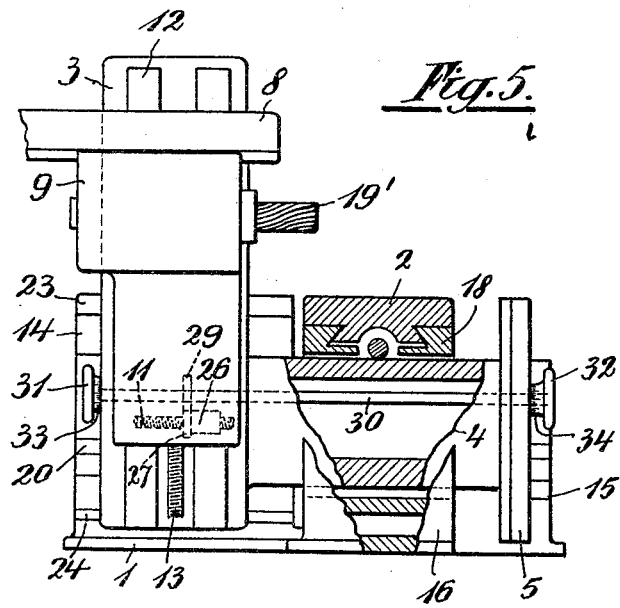
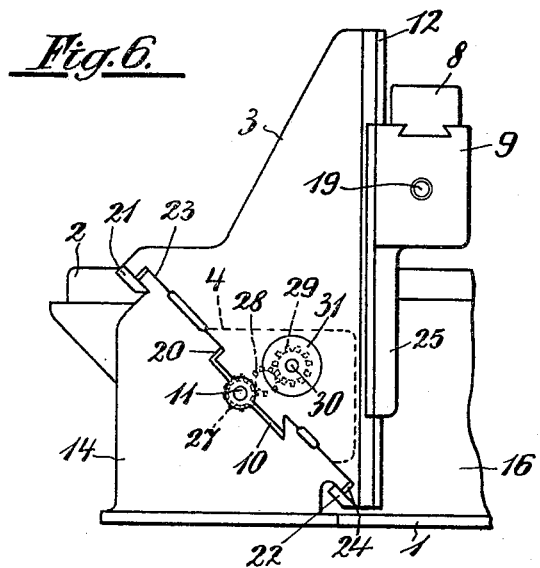

Patented May 9, 1933

1,908,478

UNITED STATES PATENT OFFICE

FELIX EISELE, OF STUTTGART, GERMANY

MACHINE TOOL

Application filed January 14, 1932, Serial No. 586,587, and in Germany June 10, 1931.

My invention relates to machine tools and more particularly to machine tools of the type in which a movable U-shaped tool girder is provided on the bed of the machine. For instance, in milling machines of the Lincoln type it has been suggested to provide a movable tool girder having a main and an auxiliary column connected by an overarm or overhanging arm which straddles a milling table. The spindle box or arbor is adapted to be displaced vertically on its column or columns. The vertical and transverse movements which are performed by the spindle box and the columns are normally for adjustment only and not for cutting.

It is an object of my invention to improve a machine tool of the Lincoln type. To this end I provide, on the bed of the machine, a movable U-shaped tool girder which is so arranged that it straddles the table, with its shanks or columns extending vertically at opposite sides of the table. The tool girder is arranged to be displaced with respect to the bed and its shanks or columns are connected by a brace below the table.

Some machines of the Lincoln type have no means whatever for transverse movement, while in others the transverse movement is performed by the milling table which is mounted on a carriage for this purpose. In other machines the milling arbor can be displaced transversely which has the drawbacks that the movement obtained in this manner is very limited and the means for performing it are mostly complicated and difficult in manipulation.

The principal advantage of the Lincoln type is that the milling table is rigidly supported on the bed of the machine practically throughout its length so that vibration is eliminated, the operation is very exact, and the output high as the absence of vibration permits heavy cuts, but their principal drawback is lack of adaptability. In particular, transverse or vertical milling operations are either quite impracticable or can be performed in a very imperfect manner only. Another drawback is that the manipulation of such machine is complicated, difficult and tedious, particularly if a given type of blank is exchanged for another blank or if a milling cut is altered. In this Lincoln type having a principal and an auxiliary column for supporting the milling spindle or milling arbor, the two columns are quite independent units as they are separated by the milling table and not connected directly on the bottom by rigid means so that on account of the inevitable slack the two columns cannot be moved in exactly the required parallel relation even if equipped with a common drive. This is the reason, why, as mentioned, the vertical and transverse displacement of the spindle box and columns or arbor serves normally for adjustment only and not for cutting. In most cases, a common drive for the two columns is not provided and it will be understood that the separate adjustment of each column, and the adjustment of the arbor with respect to the two columns, is a very difficult operation. Another drawback is that the base or bases, on which the column or columns, is supported on the machine, is rather narrow so that it is necessary to provide clamping means for preventing vibration of the column or columns.

Another general type of milling machine is the bracket machine. Such bracket machines have a milling table which is mounted to be displaced longitudinally on a carriage, the carriage being mounted on a bracket or knee for transverse displacement. The bracket or knee is mounted for vertical displacement on the column of the machine. By these means, a simple expedient for shifting the work in the three principal directions, is provided and many of the complicated operations required in bracketless machines are eliminated. On the other hand, bracket machines of this type present the drawback that the work moves in three directions and therefore the slack in the three guides for performing the movements is added, which interferes with the output of the machine and the exactitude of its operation. Another drawback is that the milling table is supported on a comparatively narrow base only and projects far on opposite sides thereof. It has been attempted to eliminate these drawbacks of the bracket machine by providing bracing columns for the bracket. The improvement effected by these, however, is insignificant because it does not influence the unfavourable supporting of the milling table and the slack from the three movements. This is why exact and heavy cuts cannot be performed on bracket machines even if equipped with bracing columns for the knee, because the inevitable variations of the cutting pressure which occur in all milling operations, result in vibrations of the machine. In view of all these difficulties which make up for its superiority in other respects, the bracket machine has been generally abandoned in favour of the Lincoln type.

My invention, while eliminating the aforesaid drawbacks of the Lincoln type, conserves the advantages of both types i. e. the exactitude and high output of the Lincoln type and the simple and rapid manipulation and adaptability of the bracket machine.

Normally the Lincoln type is equipped with a principal and an auxiliary column, but it may also possess two principal columns. According to my invention the columns are connected by a brace which extends below the milling table through a suitable recess of the machine frame. In this manner the two columns become a rigid unit. The two columns, with the overarm and the brace, constitute a frame which may be displaced transversely to the milling table without undoing any connections. Besides, an exact common drive for the milling arbor at the principal column and the block by which the arbor is suported at the auxiliary column, is readily arranged in the brace which is preferably a hollow casting, so that the arbor is displaced vertically without interfering with the connection of the arbor and the overarm at the auxiliary column. My invention also relates to machines of the kind described in which the overarm is dispensed with or moved out of the way so that the two columns are connected only by the brace.

Other advantages of my invention will appear from the following specification.

In the drawings affixed to this specification and forming part thereof two types of Lincoln milling machines designed in accordance with my invention are illustrated diagrammatically by way of example.

In the drawings

Figs. 1 to 4 illustrate the first-mentioned type in which the two columns are connected by the overarm and the brace, and Figs. 5 and 6 illustrate the other type in which the columns are connected only by the brace.

More particularly,

Fig. 5 is a partly sectional elevation of the machine embodying the other type, and Fig. 6 is an end elevation of this machine, viewed from the left in Fig. 5.

Figure 1:
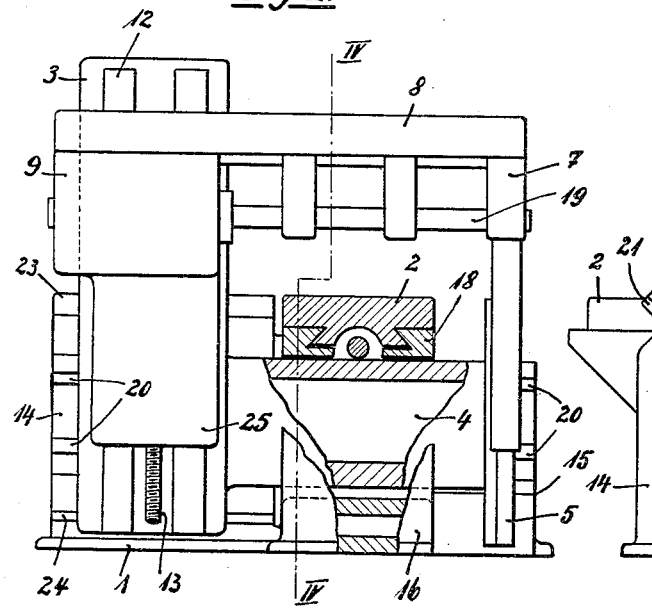
Fig. 1 is an elevation of the machine, partly in section on the line I—I in Fig. 4.
Figure 2:
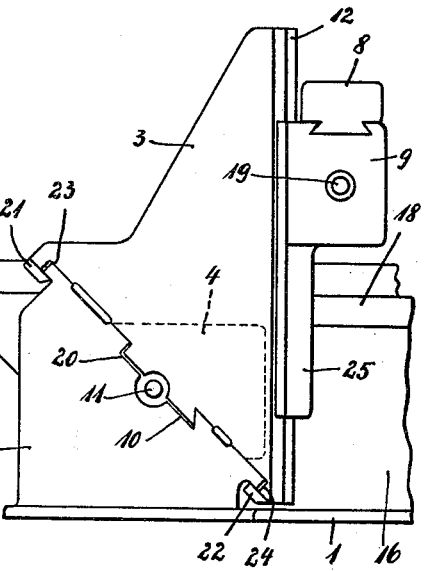
Fig. 2 is an end elevation of the machine, viewed from the left.
Figure 3:
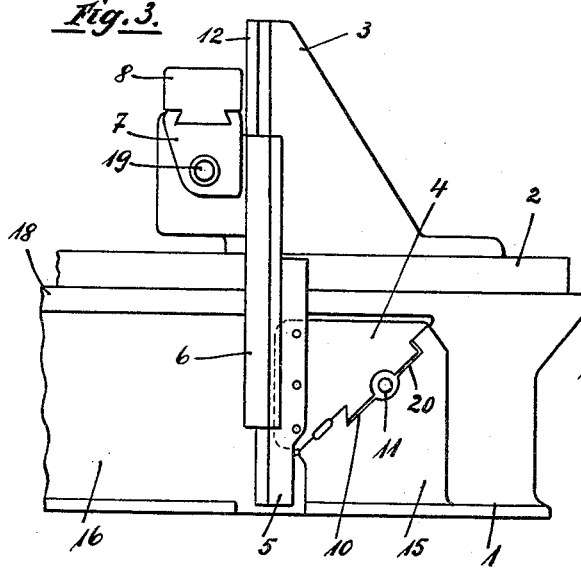
Fig. 3 is an end elevation of the machine, viewed from the right, in Fig. 1.
Figure 4:
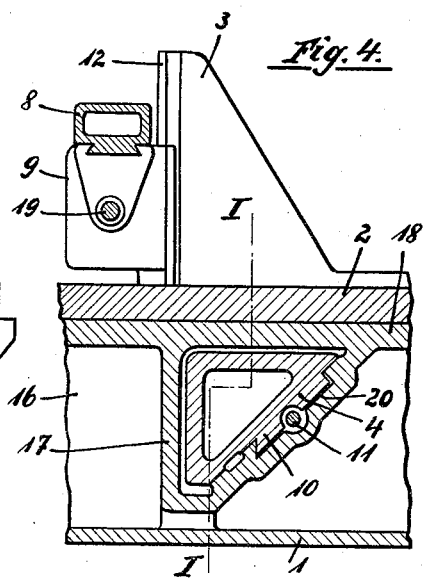
Fig. 4 is a section of the machine on the line IV—IV in Fig. 1.

Referring now to the drawings and first to Figs. 1 to 4, 1 is the bed of the machine, 16 is a support for a dovetailed guide 18 in which the milling table 2 is mounted to slide in the fore-and-aft direction of the machine and, 17, Fig. 4 is a hollow casting extending in the transverse direction of the machine below the guide 18 for the reception of the brace 4 by which the free ends of the two columns are connected, as will be described. The brace 4 and the casting 17 are here shown with a substantially triangular section but may have any other section, such as rectangular, circular, etc., as desired or required.

The tool girder is a substantially rectangular U-shaped frame with a principal column 3 and an auxiliary column 5 which are connected by the brace 4 below the table. Instead of a principal and an auxiliary column, I may also provide two principal columns. Mounted to slide on guides 12 of the principal column 3 is a plate 25 which supports the spindle box 9, with a threaded spindle 13 for moving the plate 25, and mounted to slide on the auxiliary column 5 is a member 6 which supports a block 7. 8 is the, preferably hollow, overarm which connects the spindle box 9 and the block 7, and 19 is the milling arbor one end of which is supported in the spindle box 9 while its other end is supported by the block 7.

14 and 15 are uprights on the bed 1 of the machine by which the U-shaped tool girder is guided for transverse displacement. Any suitable means, such as a spindle 11, may be provided for effecting such displacement. The faces of the uprights are preferably inclined as shown in Figs. 2 and 3 or stairlike. 10 is a dovetail at the rear of the U-shaped tool girder which preferably extends throughout the length of the tool girder including the brace 4 as shown in Fig. 4 and 20 is a dovetailed groove for the reception of the dovetail 10. 23 and 24 are slide bars at the upper and lower sides of the face and 21 and 22 are jibs on the column 3 which engage below the slide bars 23. By these means a very long and consequently rigid guide for the U-shaped tool girder in the transverse direction of the machine, i. e., transversely to the table 2, is obtained, vibration is eliminated and heavy high-speed cuts can be performed.

It is not necessary that the faces of the uprights should be inclined or stairlike but inclined or stairlike faces have the advantage of being wide without requiring much floor space. The wide faces are so rigid that any clamping means may be dispensed with. As will appear from Fig. 2 the face of the upright 14 at the left of the machine extends practically from the upper face of the table 2 to the base plate of the frame 1. Another advantage of inclined or stairlike faces at the uprights is that the guides 12 for the plate 25, with the spindle box 9, can be made very long, as will appear from Fig. 2, resulting in a rigid connection for the spindle box, so that clamping means may be dispensed with, and permitting efficient and exact vertical milling.

The overarm 8 may be detachably connected to the spindle box 9, and the block 7 may be detachably connected to the member 6. It will appear that the members 25 and 6, with the spindle box 9 and the arbor 19, are displaced together by the spindle 13, or any other suitable means, for mechanical or manual operation. If large or cumbersome pieces are to be machined the member 6 is disconnected from the block 7 and removed or shifted down along the auxiliary column 5.

Referring now to Figs. 5 and 6, these illustrate the machine in which the overarm 8 is moved out of the way. In this case the brace 4 serves specially to form a very long and consequently rigid guide for the principal column 3 on the bed, and for this reason my invention brings the advantage of improving also machine tools with one or more principal columns only, not connected by any means whatever, such as boring machines and vertical milling machines etc. 19' is a milling cutter on the arbor 19. The brace 4 serves in this case as a bracket for the column or columns 3 and 5 the brace or brackets extending below the table and forming a very long and consequently rigid guide so that any clamping means may be dispensed with, and without requiring much floor space.

The brace 4, which, as mentioned, may be of any desired section, is shown as cast integral with the principal column 3 and connected to the auxiliary column 5 by any suitable means, such as screws, pins or the like, but it may also be cast integral with or detachably connected to, both columns. Instead of a single brace 4, I may provide several braces extending through a single recess, or several recesses, of the frame 1. I may also provide adjustable means (not shown) for connecting the brace to the columns, or to one of them, so that the distance of the columns may be varied.

The adaptability of the machine may be increased by providing any desired number of milling spindles or arbors at the spindle box 9, at the overarm 8, or at the auxiliary column 5, the milling table 2 may be mounted to slide on a carriage (not shown) which is adapted to be rocked or tilted, or rotary or rocking tables may be arranged on the milling table. Means may also be provided for lifting the cutter off the work for quick return.

Another important advantage of my invention is that the brace 4, if hollow as shown, may be utilized for arranging therein driving or control mechanisms (as illustrated in Figs. 5 and 6, it being understood that such mechanisms may also be arranged in the brace of the machine illustrated in Figs. 1 to 4) thus simplifying the means for the adjusting and machining movements and permitting arranging of controlling members at the side of the column 3 and also at the side of the column 5, so that the machine may be controlled from both ends in a very simple manner and without interfering with its other parts.

As illustrated by way of example in Figs. 5, and 6, 27 is a pinion on the spindle 11. The pinion is held against axial displacement on the principal column 3 and has an internally threaded boss 26 for engaging the threaded spindle 11. 29 is a pinion on a shaft 30 which extends from the principal column 3 to the auxiliary column 5 through the hollow brace or bracket 4 and is equipped with hand wheels 31 and 32 on its projecting ends, the hand wheels having graduations on their bosses 33 and 34, for exactly adjusting the shaft 30. 29 is a pinion which is splined on the shaft 30 and 28 is an intermediate pinion by which the pinions 27 and 29 are connected. Means, not shown, are provided for moving the pinion 29 and the intermediate pinion 28 along the shaft 30 as the pinion 27, with its boss 26, travels along the threaded spindle 11.

It will be understood that by my invention the Lincoln milling machine which heretofore was used principally as a one-purpose machine for quantity production or for machining very large and heavy articles, is changed into a milling machine of universal adaptability which on account of its easy and rapid manipulation and on account of the possibility of milling exactly and at high output in all directions, is equally suitable for quantity production as for the production of individual articles or small-series production.

My invention is not limited to milling machines but may also be adapted to other machine tools such as planers, grinding machines boring machines etc.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. In a machine tool a U-shaped tool girder having two columns or shanks arranged to be displaced with respect to the bed of the machine and straddling the table of the machine and a brace connecting the shanks of said tool girder below the table, and a guide for said tool girder on the bed of the machine.

2. In a machine tool a U-shaped tool girder having two columns or shanks, a guide on the bed of the machine, said tool girder straddling the table of the machine and adapted to be displaced on said guide, a brace connecting the shanks of said tool girder below the table and means on said braces for engaging said guide.

3. In a machine tool a U-shaped tool girder having two columns or shanks, a guide on the bed of the machine having an inclined or stairlike face, said tool girder straddling the table of the machine and adapted to be displaced on said guide, a brace connecting the shanks of said tool girder below the table and means on said braces for engaging said guide.

4. In a machine tool a U-shaped tool girder having two columns or shanks arranged to be displaced with respect to the bed of the machine and straddling the table of the machine and a hollow brace having arranged therein driving and control mechanisms and connecting the shanks of said tool girder below the table.

5. In a machine tool a tool girder having a column arranged to be displaced with respect to the bed of the machine and having a brace extending transversely below the table, a guide on the bed of the machine having an inclined face, and means on said brace for engaging said guide.

6. In a machine tool, a tool girder having a pair of columns arranged at opposite sides of the table of the machine, a brace extending below the table of the machine and connected to the two columns, and a guide for said tool girder on the bed of the machine.

7. In a machine tool, a tool girder having a pair of columns arranged at opposite sides of the table of the machine, a brace extending below the table of the machine and connected to the two columns, a guide for said tool girder on the bed of the machine, and means on said brace for engaging said guide.

In testimony whereof I affix my signature.

FELIX EISELE.